United States Patent [19]
Furuta et al.

[11] Patent Number: 5,625,000
[45] Date of Patent: Apr. 29, 1997

[54] THERMOPLASTIC RESIN COMPOSITION

[75] Inventors: Motonobu Furuta, Chiba; Takanari Yamaguchi, Ibaraki, both of Japan

[73] Assignee: Sumitomo Chemical Company, Limited, Osaka, Japan

[21] Appl. No.: 319,229

[22] Filed: Oct. 6, 1994

[30] Foreign Application Priority Data

| Oct. 7, 1993 | [JP] | Japan | 5-251637 |
| Nov. 15, 1993 | [JP] | Japan | 5-285177 |
| Dec. 27, 1993 | [JP] | Japan | 5-330246 |

[51] Int. Cl.$^6$ .................................................. C08L 71/12
[52] U.S. Cl. .......................... 525/68; 525/132; 525/392; 525/396
[58] Field of Search .................. 525/68, 132, 392, 525/396

[56] References Cited

U.S. PATENT DOCUMENTS

| 4,454,284 | 6/1984 | Ueno et al. | 525/68 |
| 4,460,743 | 7/1984 | Abe et al. | 525/68 |
| 5,001,010 | 3/1991 | Chao et al. | 428/417 |
| 5,141,791 | 8/1992 | Chao et al. | 428/209 |
| 5,162,440 | 11/1992 | Akkapeddi et al. | 525/68 |
| 5,278,254 | 1/1994 | Furuta et al. | 524/611 |
| 5,334,636 | 8/1994 | Fujii et al. | 525/68 |
| 5,385,976 | 1/1995 | Furuta et al. | 525/68 |

FOREIGN PATENT DOCUMENTS

| 0055473 | 12/1981 | European Pat. Off. . |
| 0467261 | 7/1991 | European Pat. Off. . |
| 0507966 | 10/1991 | European Pat. Off. . |
| 0514087 | 5/1992 | European Pat. Off. . |
| 1694274 | 8/1971 | Germany . |

*Primary Examiner*—W. Robinson H. Clark
*Attorney, Agent, or Firm*—Birch, Stewart, Kolasch & Birch, LLP

[57] ABSTRACT

A thermoplastic resin composition containing (A) 100 parts by weight of at least one modified polyphenylene ether selected from the group consisting of (A1) a modified polyphenylene ether having repeating units of the formula (1):

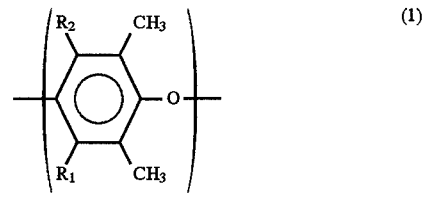

in which $R_1$ and $R_2$ are, independently from each other, a hydrogen atom or a hydrocarbon group having 1 to 20 carbon atoms and having a number average polymerization degree of 20 to 1200, in which $0.02/X$ to $1/X$ of methyl groups at the 2- and/or 6-positions of phenylene group are modified to an aminomethyl group in which X is a number average polymerization degree and (A2) a modified polyphenylene ether comprising polyphenylene ether to which an amino group-containing monomer is graft polymerized, and (B) 0.1 to 70 parts by weight of an epoxy group-containing ethylene copolymer comprising (a) 50 to 99% by weight of ethylene units, (b) 0.1 to 30% by weight of unsaturated carboxylic acid diglycidyl ester units or unsaturated glycidyl ether units and (c) 0 to 50% by weight of ethylenically unsaturated ester compound units, which composition has improved molding processability and impact resistance.

10 Claims, 2 Drawing Sheets

THERMOPLASTIC RESIN COMPOSITION

BACKGROUND OF THE INVENTION

1. Field of the Invention

The present invention relates to a novel thermoplastic resin composition which is used in the production of a molded article by injection molding and extrusion molding.

2. Description of the Related Art

Polyphenylene ether has excellent properties such as heat resistance, hot water resistance, dimensional stability, and mechanical and electrical properties, while it has some drawbacks such as poor moldability due to high melt viscosity, low chemical resistance and low heat impact resistance.

As a technique for improving molding processability of polyphenylene ether, it is known to compound polystyrene in polyphenylene ether. However, heat resistance of polyphenylene ether is considerably deteriorated, while the molding processability is improved.

Japanese Patent KOKAI Publication No. 108153/1982 discloses compounding of a copolymer of an olefin with diglycidyl methacrylate and/or diglycidyl acrylate to polyphenylene ether provides a composition having excellent impact resistance. But, molding processability and heat resistance of this composition are still unsatisfactory.

SUMMARY OF THE INVENTION

An object of the present invention is to provide a thermoplastic resin composition which is cheap and has improved molding processability and impact resistance while making use of good properties of polyphenylene ether such as mechanical properties, heat resistance and the like.

According to the present invention, there is provided a thermoplastic resin composition comprising (A) 100 parts by weight of at least one modified polyphenylene ether selected from the group consisting of (A1) a modified polyphenylene ether comprising repeating units of the formula (1):

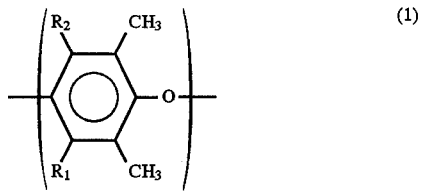

wherein $R_1$ and $R_2$ are, independently from each other, a hydrogen atom or a hydrocarbon group having 1 to 20 carbon atoms and having a number average polymerization degree of 20 to 1200, in which 0.02/X to 1/X of methyl groups at the 2- and/or 6-positions of phenylene group are modified to an aminomethyl group wherein X is a number average polymerization degree and (A2) a modified polyphenylene ether comprising polyphenylene ether to which an amino group-containing monomer is graft polymerized, and (B) 0.1 to 70 parts by weight of an epoxy group-containing ethylene copolymer comprising (a) 50 to 99% by weight of ethylene units, (b) 0.1 to 30% by weight of unsaturated carboxylic acid diglycidyl ester units or unsaturated glycidyl ether units and (c) 0 to 50% by weight of ethylenically unsaturated ester compound units.

DETAILED DESCRIPTION OF THE INVENTION

Figure 1:
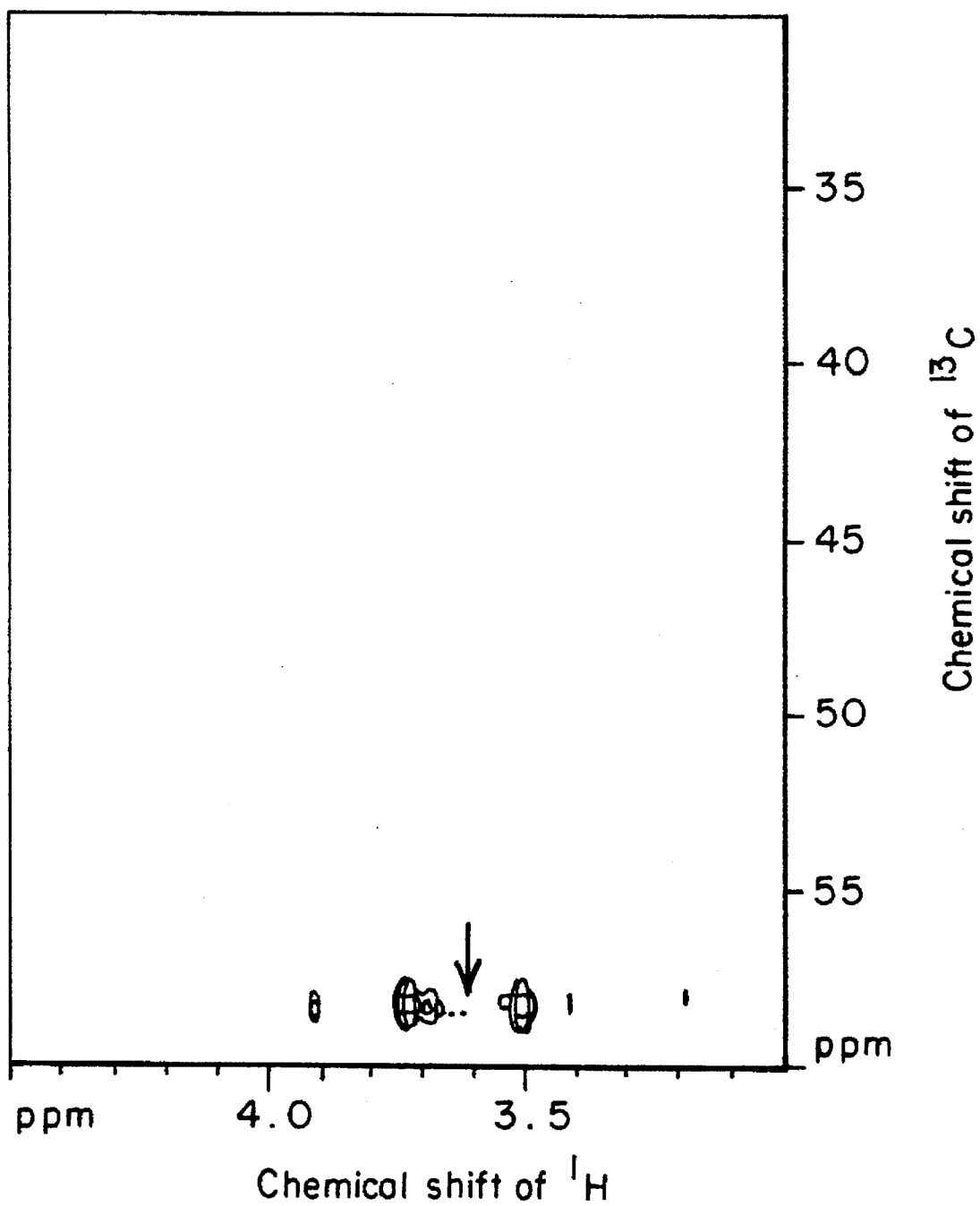
FIG. 1 is a two-dimensional HMQC NMR spectrum of the polyphenylene ether (R-1).

The amino group-containing modified polyphenylene ether used as the component (A1) in the thermoplastic resin composition of the present invention is a modified polyphenylene ether comprising repeating units in which a part of the methyl groups at the 2-and/or 6-positions of the phenylene groups are modified to the aminomethyl groups (—$CH_2NH_2$). The repeating units replaced by the aminomethyl groups may be terminal repeating units, or may be present at intermediate positions of the backbone. In particular, the polyphenylene ether comprising the aminomethyl-replaced repeating units as the terminal units is preferred since it can be easily prepared.

The process for preparing the modified polyphenylene ether of the component (A1) will be explained.

One of the preferred processes comprises polymerizing a nucleus-substituted phenol of the formula (2):

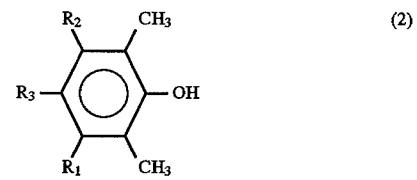

wherein $R_1$, $R_2$ and $R_3$ are, independently from each other, a hydrogen atom or a hydrocarbon group having 1 to 20 carbon atoms using an oxidative coupling catalyst in the presence of an amine of the formula (3):

wherein $Q_1$ and $Q_2$ are, independently from each other, a hydrogen atom, an alkyl group having 1 to 24 carbon atoms or an aralkyl group having 7 to 24 carbon atom, provided that $Q_1$ and $Q_2$ are not simultaneously hydrogen atoms, or $Q_1$ and $Q_2$ are both alkylene groups and forms a ring, in an amount of 0.001 to 0.2 mole per one mole of the nucleus-substituted phenol to obtain the polyphenylene ether comprising the repeating units in which the methyl groups at the 2- and/or 6-positions of the phenylene group are modified to the group of the formula (4):

wherein $Q_1$ and $Q_2$ are the same as defined above.

The repeating unit to which the secondary or tertiary amine (4) is bonded may be the terminal unit of the polyphenylene ether, or may be present in the intermediate of the backbone. In particular, the polyphenylene ether comprising the such repeating units as the terminal units is preferred since it can be easily prepared.

The amine (3) is present in an amount of 0.001 to 0.2. mole, preferably 0.005 to 0.05 mole per one mole of the nucleus-substituted phenol. When the amount of the amine is less than 0.001 mole per one mole of the nucleus-substituted phenol, any polyphenylene ether having good properties is not obtained. When the amount exceeds 0.2 mole, any polyphenylene ether having a practical molecular weight cannot be obtained.

The nuclei-substituted phenols of the formula (2) can be used independently, or as a mixture of two or more of the phenols.

Preferred examples of the nucleus-substituted phenol are 2,6-dimethylphenol, 2,3,6-trimethylphenol and the like. Among them, 2,6-dimethylphenol is particularly preferred.

Specific examples of the amine of the formula (3) are primary amines such as n-propylamine, isopropylamine, n-butylamine, isobutylamine, sec.-butylamine, n-hexylamine, n-octylamine, 2-ethylhexylamine, cyclohexylamine, laurylamine, benzylamine, etc.; and secondary amines such as diethylamine, di-n-propylamine, di-n-butylamine, diisobutylamine, di-n-octylamine; piperidine, 2-pipecoline, etc. A polyamine which is regarded as having the amine of the formula (3) as a repeating unit is equivalent to the amine of the formula (3). Examples of such polyamine are ethylenediamine, piperazine, 1,3-dipiperidylpropane, and the like.

In the polymerization of the nucleus-substituted phenol using the oxidative coupling catalyst, it is preferred to use the amine of the formula (3) and a known catalyst system comprising a copper compound, a manganese compound or a cobalt compound and a ligand selected from bases.

There are exemplified a process comprising oxidation coupling the phenol monomer and oxygen in the presence of a catalyst comprising a manganese salt, a basic reaction medium and a secondary amine as disclosed in Japanese Patent KOKAI Publication No. 179993/1978; and a process for oxidation polymerizing the nucleus-substituted phenol with an oxygen-containing gas in an organic solvent in the presence of a catalyst comprising one or more divalent manganese salts, at least one base compound selected from the group consisting of an hydroxide, alkoxide or phenoxide of a metal of the IA group of the Periodic Table and a hydroxide or oxide of a metal of the IIA group, an alkanol amine and an amine as disclosed in Japanese Patent KOKAI Publication No. 54424/1988.

Then, the polyphenylene ether in which the methyl groups at the 2- and/or 6-positions of the phenylene groups are bonded with the secondary or tertiary amine as shown by the formula (4) is melt kneaded while venting to obtain the modified polyphenylene ether used as the component (A1) in the thermoplastic resin composition of the present invention, that is, the modified polyphenylene ether in which the methyl groups at the 2- and/or 6-positions of the phenylene groups are mollified to the aminomethyl group ($—CH_2NH_2$).

The melt kneading is carried out at a cylinder temperature of 200° to 300° C., preferably 230° to 280° C. When the cylinder temperature is lower than 2000° C., the molding processability of the raw material polyphenylene ether is not good, while when the resin temperature is higher than 300° C., the polyphenylene ether may be decomposed unpreferably.

For melt kneading, conventionally used kneading apparatuses such as single or twin screw extruders, various types of kneader and the like can preferably used.

The polyphenylene ether may be melt kneaded by adding a radical initiator during kneading. Alternatively, the radical initiator can be added to the polyphenylene ether and then melt kneaded. Preferably usable radical initiators include cumene hydroperoxide, tert.-butyl hydroperoxide, dimethyl-2,5-bis(hydroperoxy)hexane, 1,3-bis(tert.-butylperoxyisopropyl)benzene, tert.-butyl peroxide, 2,6-di-tert.-butyl-4-methylphenol, and the like.

The modified polyphenylene ether (A1) used in the present invention is characterized in that 0.02/X to 1/X, preferably 0.05/X to 1/X of the methyl groups at the 2- and/or 6-positions of the phenylene group are modified to the aminomethyl group wherein X is a number average polymerization degree.

When the number of the aminomethyl groups is less than 0.02/X of the methyl groups at the 2- and/or 6-positions of the phenylene groups, the heat resistance or the mechanical properties are not sufficiently improved when the modified polyphenylene ether is used as a component of the resin composition.

The modified polyphenylene ether of the present invention comprises 20 to 1200, preferably 30 to 1000 repeating units of the formula (1) on the number average. When the number of the repeating units of the formula (1) is outside this range, the processability of the resin composition may be deteriorated or the mechanical properties of the resin composition may be insufficient.

When unmodified polyphenylene ether comprising the repeating units (1) only is used as a component of the thermoplastic composition of the present invention, its reactivity with the epoxy group-containing ethylene copolymer (B) is insufficient. But, the modified polyphenylene ether in which the methyl groups at the 2- and/or 6-positions of the phenylene groups are modified to the aminomethyl group preferably has good reactivity with the epoxy group-containing ethylene copolymer (B).

The modified polyphenylene ether (A2) used in the present invention may be prepared by polymerizing a nucleus-substituted phenol of the formula (5):

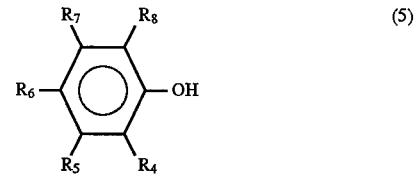

wherein $R_4$ to $R_8$ are, independently from each other, a hydrogen atom or a hydrocarbon group having 1 to 20 carbon atoms using an oxidative coupling agent to obtain unmodified polyphenylene ether and then graft polymerizing an amino group-containing monomer.

The amino group-containing monomer includes a primary amine and a secondary amine.

Preferably, the primary or secondary amine may have a group which is reactive to the polyphenylene ether in addition to the amino group. As the group reactive to the polyphenylene ether, a polymerizable group such as a double bond or a triple bond is preferred.

Such monomer may bond to the polyethylene ether in a single molecule form or graft polymerized to the polyphenylene ether in a polymer form comprising at least two molecules.

Specific examples of the primary amine are styrene monomers having an amino group such as aminostyrene, aminomethylstyrene, etc., allylamine, allylaniline, stearylamine, N-acryloylamine, N-methacryloylamine, N-phenyl-N-methacryloylamine, and the like. Their isomers may be used also.

Specific examples of the secondary amine are diallyamine, vinylimidazole and the like.

Among those amines, allylamine, diallylamine and, vinylimidazole are preferably used.

The primary amine and/or the secondary amine may be used independently or as a mixture of two or more of them.

As the modified polyphenylene ether (A2), a modified polyphenylene ether which is prepared by graft polymerizing a styrene monomer together with the amino group-containing monomer on the polyphenylene ether is also used.

Examples of such styrene monomer are styrene, 2,4-dichlorostyrene, p-methoxystyrene, p-methylstyrene, p-phenylstyrene, p-divinylbenzene, p-(chloromethoxy) styrene, α-methylstyrene, o-methyl-α-methylstyrene, m-methyl-α-methylstyrene, p-methyl-α-methylstyrene, p-methoxy-α-methylstyrene and the like. They may be used independently or as a mixture of two or more of them. Among them, styrene is preferably used. When the styrene monomer is used, a monomer copolymerizable with the styrene monomer may be optionally used in a small amount.

Examples of the monomer copolymerizable with the styrene monomer are acrylonitrile, methacrylonitrile, fumaric acid, fumaric anhydride, alkyl acrylates, alkyl methacrylates, glycidyl acrylate, glycidyl methacrylate, vinyl acetate, 2-vinylnaphthalene, vinyl carbazole, and the like. Their derivatives may be used also. They may be used independently or as a mixture of two or more of them.

To prepare the modified polyphenylene ether (A2), for example, polyphenylene ether and the primary amine and/or the secondary amine are melt kneaded or suspension reacted.

The melt kneading is carried out at a cylinder temperature of 200° to 300° C., preferably 230° to 290° C. When the cylinder temperature is lower than 200° C., the molding processability of the raw material polyphenylene ether is not good, while when the resin temperature is higher than 300° C., the polyphenylene ether may be decomposed unpreferably.

For melt kneading, conventionally used kneading apparatuses such as single or twin screw extruders, various types of kneader and the like can preferably used.

The polyphenylene ether may be melt kneaded by adding a radical initiator during kneading. As the radical initiator, any of conventionally used radical initiators may be used. For example, azo compound such as 2,2'-azobisisobutyronitrile and radical initiators which are described in Japanese Patent KOKAI Publication No. 160856/1991 can be used.

Preferably, the modified polyphenylene ether as the component (A1) or (A2) of the thermoplastic resin composition of the present invention and the; raw material polyphenylene ether therefor have a reduced viscosity $\eta_{sp}/c$ (measured at 25° C. with a chloroform solution of 0.5 g/dl) of 0.30 to 0.65 dl/g. When $\eta_{sp}/c$ is lower than 0.30 dl/g, the heat resistance of the composition is severely deteriorated, while when $\eta_{sp}/c$ exceeds 0.65 dl/g, the moldability of the composition is deteriorated.

To the modified polyphenylene ether as the component (A) of the thermoplastic resin composition of the present invention, unmodified polyphenylene ether can be added, if desired.

The epoxy group-containing ethylene copolymer (B) which is one of the components of the thermoplastic resin composition of the present invention is an ethylene copolymer comprising (a) 50 to 99% by weight of ethylene units, (b) 0.1 to 30% by weight, preferably 0.5 to 20% by weight of unsaturated carboxylic acid diglycidyl ester units or unsaturated glycidyl ether units and (c) 0 to 50% by weight of ethylenically unsaturated ester compound units.

Preferred examples of a compound which provides the unsaturated carboxylic acid glycidyl ester unit: and the unsaturated glycidyl ether unit are compounds of the following formulas (6) and (7):

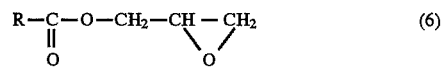

wherein R is a $C_2$–$C_{13}$ hydrocarbon group having an ethylenically unsaturated bond,

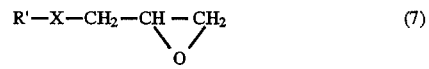

wherein R' is a $C_2$–$C_{18}$ hydrocarbon group having an ethylenically unsaturated bond, and X is —$CH_2$—O— or

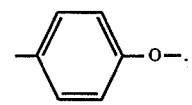

Specific examples of such compound are glycidyl acrylate, glycidyl methacrylate, glycidyl itaconate, allyl glycidyl ether, 2-methylallyl glycidyl ether, styrene p-glycidyl ether, and the like.

As the epoxy group-containing ethylene copolymer, a copolymer comprising three or more kinds of monomer units such as a copolymer of the unsaturated carboxylic acid glycidyl ester or unsaturated glycidyl ether, ethylene and the ethylenically unsaturated ester compound (c) may be used.

Examples of the ethylenically unsaturated ester compound (c) are vinyl esters of carboxylic acids and alkyl esters of α, β-unsaturated carboxylic acids such as vinyl acetate, vinyl propionate, methyl acrylate, ethyl acrylate, butyl acrylate, methyl methacrylate, ethyl methacrylate, butyl methacrylate, and the like. Among them, vinyl acetate, methyl acrylate and ethyl acrylate are preferred.

Preferred examples of the epoxy group-containing ethylene copolymer (B) used in the present invention are a copolymer comprising ethylene units and glycidyl methacrylate units, a copolymer comprising ethylene units, glycidyl methacrylate units and methyl acrylate units, a copolymer comprising ethylene units, glycidyl methacrylate units and ethyl acrylate units, a copolymer of comprising ethylene units, glycidyl methacrylate units and vinyl acetate units, and the like.

A melt flow index (measured according to JIS K 6760) of the epoxy group-containing ethylene copolymer is preferably from 0.5 to 100 g/10 min., more preferably from 2 to 50 g/10 min. while it may be outside this range. But, when the melt index exceeds 100 g/10 min., the resin composition may not have sufficient mechanical properties. When the melt flow index is less than 0.5 g/10 min., the compatibility of the modified polyphenylene ether (A) with the epoxy group-containing ethylene copolymer (B) may be deteriorated.

The epoxy group-containing ethylene copolymer (B) may be prepared by copolymerizing corresponding monomers at a temperature of 100° to 300° C. under pressure of 500 to 4000 Atm. in the presence of a radical initiator in the presence or absence of a chain transfer agent. Alternatively, The epoxy group-containing ethylene copolymer (B) may be prepared by mixing the unsaturated epoxy compound, polyethylene and the radical initiator in an extruder to melt graft polymerize the unsaturated epoxy compound on polyethylene.

In the thermoplastic resin composition of the present invention, an amount of the epoxy group-containing ethylene copolymer (B) is from 0.1 to 70 parts by weight, preferably from 1 to 40 parts by weight, more preferably from 3 to 30 parts by weight per 100 parts by weight of the modified polyphenylene ether (A). When the amount of the component (B) is less than 0.1 parts by weight, the impact resistance of the resin composition is not improved. When this amount exceeds 70 parts by weight, the heat resistance of the resin composition is undesirably decreased.

The resin composition comprising the amino group-containing polyphenylene ether (A) and the epoxy group-containing ethylene copolymer (B) can further comprise an alkenyl aromatic resin (C). Amounts of the amino group-containing polyphenylene ether (A) and the alkenyl aromatic resin (C) are 1 to 99% by weight, preferably 5 to 95% by weight of the former and 99 to 1% by weight, preferably from 95 to 5% by weight of the latter.

When the amount of the component (A) is less than 1% by weight, the heat resistance of the resin composition is undesirably decreased. When this amount exceeds 99% by weight, the processability of the resin composition may not be desirably improved.

In the composition comprising the component (C), an amount of the component (B) is from 0.1 to 70 parts by weight, preferably from 1 to 40 parts by weight, more preferably from 3 to 30 parts by weight based on 100 parts by weight of the total weight of the components (A) and (C).

When the amount of the component (B) is less than 0.1 parts by weight, the impact resistance of the resin composition is not improved. When this amount exceeds 70 parts by weight, the heat resistance of the resin composition is undesirably decreased.

The thermoplastic resin composition of the present invention may be prepared by any of conventional methods. For example, the modified polyphenylene ether (A1) is beforehand prepared by melt kneading the polyphenylene ether in a kneader with venting, the epoxy group containing ethylene copolymer (B) and optionally the alkenyl aromatic resin (C) are compounded in the prepared modified polyphenylene ether (A1), and the mixture is kneaded to obtain the resin composition. Alternatively, each of the modified polyphenylene ether (A), the epoxy group-containing ethylene copolymer (B) and the alkenyl aromatic resin (C) is dissolved in a respective solvent, all the components are mixed in their solution form and then the solvents are evaporated off from the mixed solution or the mixed solution is poured in a solvent in which the resin is not dissolved to precipitated the resin.

Further, the polyphenylene ether is fed through a first inlet of an extruder and melt kneaded in the extruder between the first inlet and a second inlet to prepare the modified polyphenylene ether (A1). Then, the epoxy group-containing ethylene copolymer (B) is fed in the extruder through the second inlet to melt knead the component (A1), the component (B) and optionally the component (C) to obtain the resin composition.

In any case, it is possible to confirm that the component (A1) is a modified polyphenylene ether having the primary amine by extracting the modified polyphenylene ether and/ or polyphenylene from the resin composition, precipitating them and quantitatively analyzing the contents of amines in the extract by potentiometric titration and so on.

Further, the modified polyphenylene ether (A2) is beforehand prepared by mixing and melt kneading the raw material polyphenylene ether, the primary amine and so on, and the epoxy group-containing ethylene copolymer (B) and optionally the alkenyl aromatic resin (C) are compounded in the prepared modified polyphenylene ether (A2), and the mixture is kneaded to obtain the resin composition. Alternatively, the polyphenylene ether, the primary amine and so on are fed through the first inlet of the extruder and melt kneaded in the extruder between the first inlet and the second inlet to prepare the modified polyphenylene ether (A2). Then, the epoxy group-containing ethylene copolymer (B) is fed in the kneader through the second inlet to melt knead the component (A2), the component (B) and optionally the component (C) to obtain the resin composition.

To prepare the thermoplastic resin composition of the present invention, it is preferred to knead the components in the molten state from the industrial view point. For melt kneading, any of conventionally used kneading apparatuses such as single screw and twin screw extruders and kneaders can be used. Among them, the twin screw extruder is preferred. In the melt kneading, a cylinder temperature of the kneading apparatus is preferably from 200° to 330° C., more preferably from 220° to 310° C.

To the thermoplastic resin composition of the present invention, an inorganic filler may be optionally added. As the inorganic filler, calcium carbonate, talc, clay, silica, magnesium carbonate, barium sulfate, titanium oxide, alumina, gypsum, glass fiber, carbon fiber, alumina fiber, aluminum borate whisker, potassium titanate whisker and the like are exemplified.

To the thermoplastic resin composition of the present invention, if desired, various additives such as an antioxidant, a heat stabilizer, a light stabilizer, a flame retardant, a lubricant, an antistatic agent, an inorganic or organic colorant, a rust preventive, a crosslinking agent, a foaming agent, a fluorescent agent, a surface smoothing agent, a surface gloss improver, a mold release improver such as a fluororesin and the like can be added to the resin composition during the preparation of the composition or during the processing after the preparation of the composition.

PREFERRED EMBODIMENTS OF THE INVENTION

The present invention will be illustrated by the following examples, which are only for explanation purpose and do not limit the scope of the present invention.

In the examples, the properties are measured as follows:

Measurement of amounts of amines in the raw material polyphenylene ether and the modified polyphenylene ether Nitrogen content in the whole amine About one gram of a sample was weighed and dissolved in chloroform (50 cc). After the addition of acetic acid (5 cc), the solution was analyzed by potentiometric titration using a potentiometric titration apparatus AT-310 (manufactured by Kyoto Electronics, Co., Ltd.) (a glass-calomel electrode, a titrant: 0.1M perchloric acid (acetic acid solution)), and the nitrogen content in the whole amine was calculated according to the following equation:

$$N_T = 0.0014 \times A \times C_1 \times 100/S$$

$N_T$: Nitrogen content in the whole amine (%)

A: Titer (cc)

S: Sample amount (g)

$C_1$: Concentration of the perchloric acid solution (mole/l)

Nitrogen content in the tertiary amine.

About one gram of a sample was weighed and dissolved in chloroform (50 cc). Acetic anhydride (5 cc) was added to the solution, the solution was kept standing, and then acetic acid (5 cc) was added. Thereafter, the potentiometric titration was carried out in the same way as in the titration of the nitrogen content in the whole amine, and the nitrogen content in the tertiary amine was calculated according to the following equation:

$$N_3 = 0.0014 \times B \times C_2 \times 100/S$$

$N_3$: Nitrogen content in the tertiary amine (%)
B: Titer (cc)
S: Sample amount (g)
$C_2$: Concentration of the perchloric acid solution (mole/l)

Nitrogen content in the secondary amine.

About one gram of a sample was weighed and dissolved in chloroform (50 cc). Salicyl aidehyde (0.5 cc) was added to the solution and the solution is kept standing. Thereafter, the potentiometric titration was carried out in the same way as in the titration of the nitrogen content in the whole amine except that a 0.1 mole/l solution of hydrochloric acid in 2-propanol was used as a titrant. First, the nitrogen content $N_{2,3}$ in the sample (secondary amine+tertiary amine) was calculated according to the following equation:

$$N_{2,3} = 0.014 \times C \times D \times 100/S$$

C: Concentration of hydrochloric acid for titration (mole/l)
D: Titer (cc)
S: Sample amount (g)

Thereafter, the nitrogen content $N_2$ (%) of the secondary amine contained in the sample was calculated according to the following equation:

$$N_2 = N_{2,3} - N_3$$

Nitrogen content in the primary amine.

The nitrogen content $N_1$ (%) of the primary amine contained in the sample was calculated according to the following equation:

$$N_1 = N_T - N_2 - N_3$$

NMR measurement

Using a spectrometer AMX 600 (manufactured by Brucker), the NMR measurement is carried out at 600.14 MHz of the resonance frequency for $^1H$, and 150.92 MHz of the resonance frequency for $^{13}C$.

A sample is dissolved in $CDCl_3$ and the measuring temperature is 40° C.

Chemical shifts are calculated with the peak of $CHCl_3$ being 7.24 ppm in the case of $^1H$-NMR and with the peak of $CDCl_3$ being 77.1 ppm in the case of $^{13}C$-NMR.

The peaks of R-1 were assigned according to those described in Macromolecules, 23, 1318-1329 (1990).

Measurements of physical properties of a molded article

Measurement of the physical properties was effected on a molded article which was prepared by kneading the resin composition using a twin screw extruder (PCM-30 type manufactured by Ikegai Tekko Co., Ltd.) at a cylinder temperature of 260° to 330° C. and injection molding the composition using an injection molding machine (PS 40 E4A SE type manufactured by Nissei Resin Industries, Ltd.) at a molding temperature of 260° to 330° C. and a mold temperature of 70° to 130° C.

Melt flow index (MI)

A melt flow index (g/10 min.) of a polymer is measured according to JIS K 6760 under a load of 10 Kg at 280° C.

MFR of an epoxy group-containing ethylene copolymer

MFR (g/10 min.) is measured according to JIS K 6760 under a load of 2.16 kg at 190° C.

Tensile test

A tensile test is carried out with an ASTM No, 4 tensile dumbbell shape sample according to ASTM D 638 and an elongation at break and a tensile strength at break are measured.

Flexural modulus

A flexural modulus is measured with a specimen having a thickness of 6.4 mm according to ASTM D 790.

Temperature of deflection under load (TDUL)

A temperature of deflection under load (TDUL) is measured with a specimen having a thickness of 6.4 mm according to ASTM D 648 under a load of 18.6 kg.

Notched Izod impact strength

A notched Izod impact strength is measured with a specimen having a thickness of 6.4 mm according to JIS K 7110.

PREPARATION OF THE MODIFIED POLYPHENYLENE ETHER AS THE COMPONENT (A)

REFERENCE EXAMPLE 1

[Preparation of a modified polyphenylene ether (A1)]

In a jacketed 10 liter autoclave equipped with a stirrer, a thermometer, a condenser and an air inlet tube which reached the bottom of the autoclave, xylene (3420 g), methanol (1366 g), 2,6-dimethylphenol (1222 g, 10.02 moles) and sodium hydroxide (24 g) were charged to form a homogeneous solution. Then, the solution was added to a solution of diethanolamine (33.8 g), di-n-butylamine (27.7 g, 0.233 mole corresponding to 0.0233 mole per one mole of 2,6-dimethylphenol) and manganese chloride tetrahydrate (0.99 g) dissolved in methanol (100 g).

While vigorously stirring the content, air was bubbled through the content at 5 liter/min. The reaction temperature and pressure were maintained at 35° C. and 9 kg/cm², respectively. After 7 hours from the start of air bubbling, the air supply was stopped, and the reaction mixture was poured in a mixture of acetic acid (66 g) and methanol (4900 g). The resulting slurry was filtrated under reduced pressure to isolate a polyphenylene ether in a wet state.

After the isolated polyphenylene ether was washed with methanol (7200 g), it was dried at 150° C. under reduced pressure overnight to obtain the dried polyphenylene ether (1160 g).

The polymerization was carried out in eight batches to obtain about 9.2 kg of the dried polyphenylene ether in total.

The polyphenylene ether had a number average molecular weight of 6000 and a number average polymerization degree of 50. This polyphenylene ether will be referred to as "R-1".

The nitrogen contents of various amines in R-1 are shown in Table 1. From these contents, it is seen that 0.43% of the methyl groups at the 2- and 6-positions of the polyphenylene ether were substituted by the tertiary dibutylamino groups.

The polyphenylene ether R-1 (100 parts by weight), an antioxidant (Irganox 1330, a trade name) (0.3 part by weight) and 2,6-di-tert.-butyl-4-methylphenol (0.2 part by weight) were mixed in a Henschel mixer, and kneaded using a twin screw extruder PCM-30 (manufactured by Ikegai Tekko Co., Ltd.) by charging it in a hopper which had been kept under a nitrogen atmosphere, at a cylinder temperature of 273° C. at a screw rotation of 80 rpm while venting. This modified polyphenylene ether had a number average molecular weight of 6800 and a number average polymerization degree of 56.7. This modified polyphenylene ether will be referred to as "A-1".

The nitrogen contents of various amines in A-1 are shown in Table 1. Comparing with the raw material polyphenylene ether, it is seen that the modified polyphenylene having the greatly decreased amount of tertiary amine and the greatly increased amount of primary amine was obtained.

TABLE 1

Results of quantitative analysis of nitrogen in the polyphenylene ether and modified polyphenylene ether

| Sample | Nitrogen contents (%) | | | |
|---|---|---|---|---|
| | $N_T$ | $N_1$ | $N_2$ | $N_3$ |
| R-1 | 0.10 | <0.01 | <0.01 | 0.10 |
| A-1 | 0.09 | 0.07 | <0.01 | 0.02 |

From the above results, it is seen that about 0.30% of the dibutylamino groups bonded to the methyl groups were modified to the aminomethylene groups.

Figure 2:
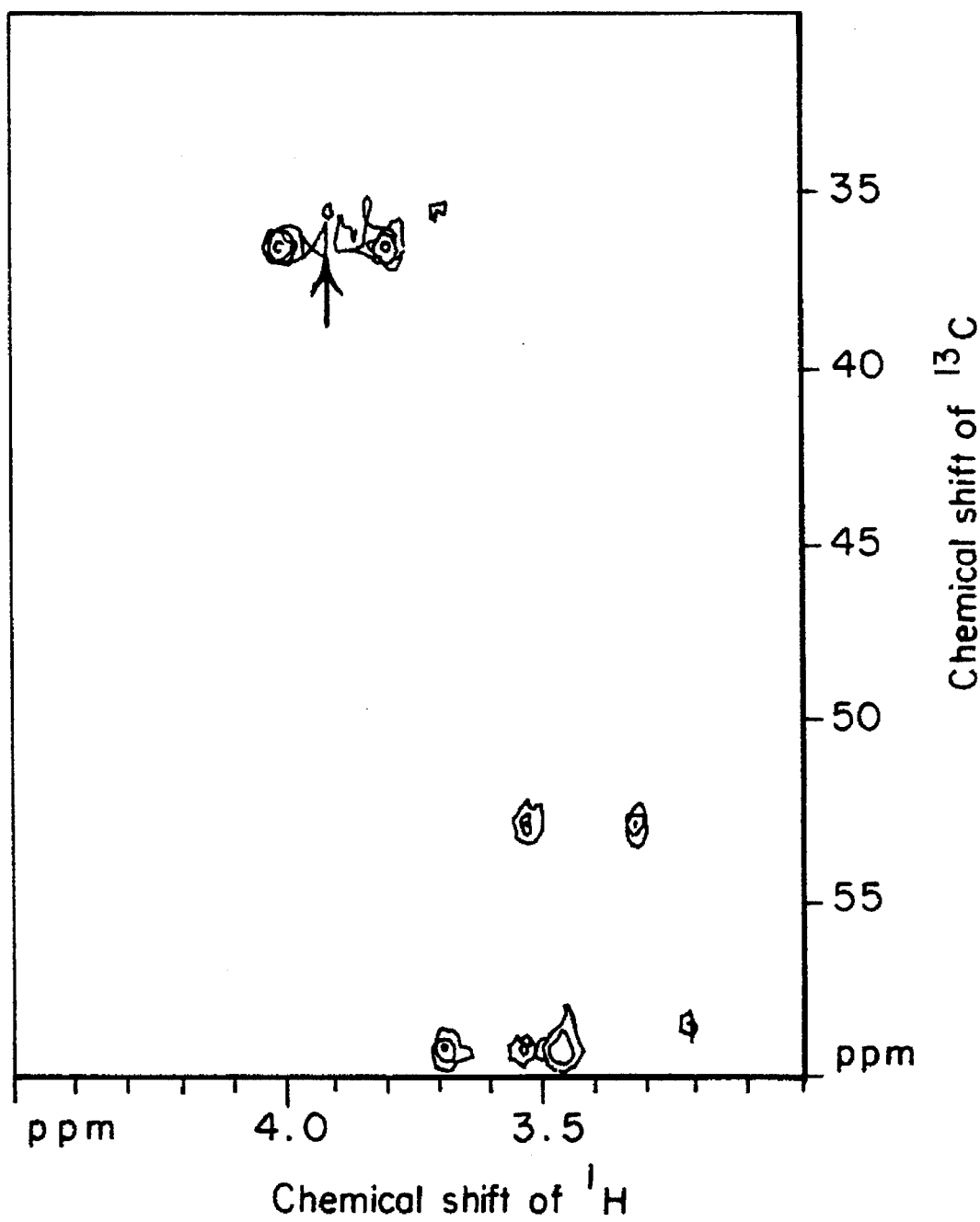
FIG. 2 is a two-dimensional HMQC NMR spectrum of the polyphenylene ether (A-1).

The two dimensional HMQC NMR spectra of R-1 and A-1 are shown in FIGS. 1 and 2 respectively.

In FIG. 1, the ordinate and the abscissa represent the chemical shifts of $^{13}C$ and $^{1}H$, respectively.

In this spectrum, since decoupling of $^{13}C$ was not effected during measurement, one signal was observed as two peaks split in the $^{1}H$ axis direction.

The $^{13}C$-NMR chemical shift of the signal was given at the peak position, and the 1H-NMR chemical shift was given as the middle point between the two split peak positions, which is shown by the arrow.

In FIG. 2, the ordinate and the abscissa represent the chemical shifts of $^{13}C$ and $^{1}H$, respectively.

In this spectrum, since decoupling of $^{13}C$ was not effected during measurement, one signal was observed as two peaks split in the $^{1}H$ axis direction.

The $^{13}C$-NMR chemical shift of the signal was given at the peak position, and the 1H-NMR chemical shift was given as the middle point between the two split peak positions, which is shown by the arrow.

The assignments of the major peaks are as follows:

In the two dimensional HMQC NMR spectrum of R-1, the signal having the chemical shifts of $^{13}C$:58.1 ppm and $^{1}H$:3.62 ppm is assigned to the carbon and hydrogen atoms, respectively of the methylene group at the 2- or 6-position of the phenylene group in the polyphenylene ether to which the dibutylamine is bonded according to Macromolecules, 23, 1318 (1990). The intensity of this signal greatly decreased in A-1, while the new signal having the chemical shifts of $^{13}C$:36.3 ppm and $^{1}H$:3.89 ppm appears. It is known that the chemical shift of a carbon atom of a methylene group in a benzyl group to which a primary amine is bonded is 39.4 ppm according to Phytochem., 18, 1547 (1979), and that the chemical shift of a hydrogen atom of the methylene group in the benzyl group to which the primary amine is bonded is 3.9 ppm according to Aldrich Library of NMR Spectra, II, 1066 (1983). Accordingly, the signal having the chemical shifts of $^{13}C$:36.3 ppm and $^{1}H$:3.89 ppm observed in A-1 is assigned to the carbon atom and hydrogen atom, respectively of the methylene group at the 2- or 6-position of the phenylene group of polyphenylene ether to which the primary amine is bonded.

These results coincide with the above results of titration analysis of the amino groups.

REFERENCE EXAMPLE 2

[Preparation of a modified polyphenylene ether (A2)]

(i) A polyphenylene ether having $\eta_{sp}/c$ of 0.40 (manufactured by Nippon Polyether Co., Ltd.) (100 parts by weight), diallylamine (2.1 parts by weight) and a radical polymerization initiator (Per-butyl PV, a trade name of Miyoshi Oil and Fat Co., Ltd.) (0.2 part by weight) were mixed together with a stabilizer by a Henschel mixer. Then, the mixture was pelletized using a twin screw extruder (PCM-30 manufactured by Ikegai Tekko Co., Ltd.) at a cylinder temperature of 265° C. with venting to obtain a modified polyphenylene ether which will be referred to as "AA-1".

(ii) A polyphenylene ether having $\eta_{sp}/c$ of 0.51 (manufactured by Nippon Polyether Co., Ltd.) (100 parts by weight), stearylamine (3.6 parts by weight) and styrene (1.1 parts by weight) were mixed together with a stabilizer by a Henschel mixer. Then, the mixture was pelletized using a twin screw extruder (PCM-30 manufactured by Ikegai Tekko Co., Ltd.) at a cylinder temperature of 286° C. with venting to obtain a modified polyphenylene ether which will be referred to as "AA-2".

(iii) A polyphenylene ether having $\eta_{sp}c$ of 0.36 (manufactured by Nippon Polyether Co., Ltd.) (100 parts by weight), aminostyrene (0.9 part by weight), maleic anhydride (0.5 part by weight) and a radical initiator (Sunperox TO, a trade name of Sanken Kako Co., Ltd.) (0.1 part by weight) were mixed together with a stabilizer (Irganox 3114). Then, the mixture was pelletized using a twin screw extruder (TEM-30 type manufactured by Nippon Iron Works Co., Ltd.) at a cylinder temperature: of 272° C. with venting to obtain a modified polyphenylene ether which will be referred to as "AA-3".

REFERENCE EXAMPLE 3

[An epoxy group-containing ethylene copolymer]

Epoxy group-.containing ethylene copolymers which were prepared by a high pressure radical copolymerization method were used. Their abbreviations, compositions and MFR are as follows:

| Abbreviation | Composition (parts by weight) |
|---|---|
| B-1 | E/GMA/MA = 64/6/30 (MFR = 9) |
| B-2 | E/GMA = 88/12 (MFR = 3) |
| B-3 | E/GMA/VA = 83/12/5 (MFR = 7) |
| BA-1 | E/GMA/VA = 89/3/8 (MFR = 3) |
| BA-2 | E/GMA/MA = 65/20/15 (MFR = 20) |

Note: E: Ethylene; GMA: Glycidyl methacrylate; MA: methyl acrylate; VA: vinyl acetate; B-2: Bondfast (a trademark of Sumitomo Chemical Co., Ltd.)

[An alkenyl aromatic resin (C)]
C-1: Polystyrene (ESBRITE, a trademark of Sumitomo Chemical Co., Ltd.; MFR=4 g/10 min. at 220° C. under 5 kg)

EXAMPLES 1–6 and COMPARATIVE EXAMPLES 1–7

Components in a composition shown in Tables 1, 2 and 3 were compounded and kneaded by a Henschel mixer, and the properties were measured. The results are shown in Tables 1, 2 and 3.

As seen from the results in Tables 1, 2 and 3, the thermoplastic resin composition of the present invention is excellent in heat resistance, mechanical properties, molding processability and the like.

TABLE 1

| | Composition (parts by weight) | | | Physical properties | | | | |
|---|---|---|---|---|---|---|---|---|
| | Component (A) | | Component (B) | | Tensile test | | Flexural test | | Izod |
| | Mod. | Unmod. | Epoxy group- cont. ethylene | TDUL | Tensile strength | Elon- gation | Flexural strength | Flexural modulus | impact strength |
| Example No. | PPE | PPE | copolymer | (°C.) | (kg/cm$^2$) | (%) | (kg/cm$^2$) | (kg/cm$^2$) | (kg · cm/cm) |
| E. 1 | A-1 (100) | — | B-1 (5) | 185 | 750 | 90 | 970 | 22800 | 24 |
| E. 2 | ↑ | — | B-1 (10) | 183 | 700 | 87 | 910 | 21400 | 31 |
| E. 3 | ↑ | — | B-1 (30) | 180 | 610 | 85 | 670 | 16100 | 42 |
| E. 4 | ↑ | — | B-2 (2) | 187 | 770 | 81 | 1100 | 26000 | 7 |
| E. 5 | ↑ | — | B-2 (10) | 185 | 710 | 78 | 980 | 23800 | 18 |
| E. 6 | ↑ | — | B-3 (10) | 181 | 660 | 89 | 910 | 22700 | 20 |
| E. 7 | A-1 (70) | R-1 (30) | B-3 (10) | 177 | 640 | 80 | 880 | 21500 | 17 |
| C. 1 | A-1 (100) | — | — | 188 | 770 | 50 | 1060 | 24000 | 3 |
| C. 2 | — | R-1 (100) | B-1 (5) | 175 | 850 | 72 | 810 | 20000 | 13 |

TABLE 2

| | Composition (parts by weight) | | | Physical properties | | | | |
|---|---|---|---|---|---|---|---|---|
| | Component (A) | | Component (B) | | Tensile test | | Flexural test | | Izod |
| | Mod. | Unmod. | Epoxy group- cont. ethylene | TDUL | Tensile strength | Elon- gation | Flexural strength | Flexural modulus | impact strength |
| Example No. | PPE | PPE | copolymer | (°C.) | (kg/cm$^2$) | (%) | (kg/cm$^2$) | (kg/cm$^2$) | (kg · cm/cm) |
| E. 8 | AA-1 (86) | — | BA-1 (14) | 178 | 610 | 81 | | 15600 | 22 |
| E. 9 | AA-1 (61) | 11*[1] | BA-1 (28) | 163 | 540 | 75 | | 13300 | 38 |
| E. 10 | AA-2 (90) | — | BA-2 (10) | 183 | 670 | 78 | | 19500 | 16 |
| E. 11 | AA-3 (95) | — | B-2 (5) | 179 | 720 | 83 | | 21800 | 20 |
| C. 3 | — | 86*[1] | BA-1 (14) | 161 | 520 | 52 | | 12900 | 13 |
| C. 4 | AA-1 (100) | — | — | 187 | 770 | 83 | | 24500 | 3 |
| C. 5 | — | 90*[2] | BA-2 (10) | 171 | 600 | 49 | | 18300 | 9 |

Note:
*[1]PPE having η$_{sp}$/c of 0.38 (manufactured by Nippon Polyether Co., Ltd.)
*[1]PPE having η$_{sp}$/c of 0.48 (manufactured by Nippon Polyether Co., Ltd.)

TABLE 3

| Example No. | Composition (parts by weight) ||||| Physical properties |||||
| | Component (A) || Component (B) | Component (C) | | | Tensile test || | |
| | Mod. PPE | Unmod. PPE | Epoxy group-cont. ethylene copolymer | Alkenyl aromatic resin | MI (g/10 min.) | TDUL (°C.) | Tensile strength (kg/cm²) | Elongation (%) | Flexural modulus (kg/cm²) | Izod impact (kg · cm/cm) |
|---|---|---|---|---|---|---|---|---|---|---|
| E. 12 | A-1 (82) | — | B-2 (10) | C-1 (8) | 3.1 | 171 | 690 | 77 | 21500 | 24 |
| E. 13 | A-1 (54) | R-1 (10) | B-2 (10) | C-1 (26) | 12.2 | 154 | 710 | 62 | 22300 | 19 |
| E. 14 | A-1 (45) | — | B-2 (10) | C-1 (45) | 19.4 | 133 | 700 | 24 | 23900 | 9 |
| E. 15 | A-1 (86) | — | B-1 (4) | C-1 (10) | 4.2 | 176 | 720 | 81 | 232100 | 14 |
| C. 6 | A-1 (90) | — | B-2 (10) | — | 0.8 | 180 | 640 | 80 | 20500 | 32 |
| C. 7 | — | R-1 (82) | B-2 (10) | C-1 (8) | 3.3 | 161 | 610 | 41 | 19300 | 16 |
| E. 16 | A-1 (96) | — | B-1 (4) | — | 1.3 | 185 | 650 | 78 | 22600 | 18 |

The thermoplastic resin composition of the present invention is excellent in heat resistance, mechanical properties, molding processability and so on, and is cheap. Using such good properties, it is used in the form of a molded article, a sheet, a tube, a film, a fiber, a laminate, or a coating material, by injection molding or extrusion molding.

What is claimed is:

1. A thermoplastic resin composition comprising:
(A) 100 parts by weight of an amino group-containing modified polyphenylene ether comprising repeating units of the formula (1):

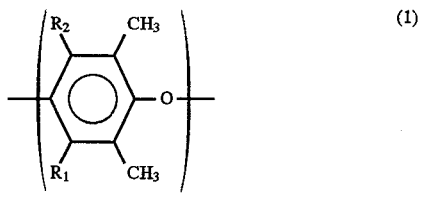

wherein $R_1$ and $R_2$ are, independently from each other, a hydrogen atom or a hydrocarbon group having 1 to 20 carbon atoms and having a number average polymerization degree of 20 to 1200, in which 0.02/X to 1/X of methyl groups at the 2- and/or 6-positions of phenylene group are modified to an aminomethyl group wherein X is a number average polymerization degree; and (B) 0.1 to 70 parts by weight of an epoxy group-containing ethylene copolymer comprising (a) 50 to 99% by weight of ethylene units, (b) 0.1 to 30% by weight of unsaturated carboxylic acid diglycidyl ester units or unsaturated glycidyl ether units and (c) 0 to 50% by weight of ethylenically unsaturated ester compound units.

2. The thermoplastic resin composition according to claim 1, which further comprises an alkenyl aromatic resin (C), wherein amounts of said alkenyl aromatic resin (C) and said amino group-containing modified polyphenylene ether (A) are 1 to 99% by weight and 99 to 1% by weight, respectively.

3. The thermoplastic resin composition according to claim 1 or 2, wherein said amino group-containing modified polyphenylene ether (A) has a reduced viscosity $\eta_{sp}/c$ (measured at 25° C. with a chloroform solution of 0.5 g/dl) of 0.30 to 0.65 dl/g.

4. The thermoplastic resin composition according to claim 1, wherein said modified polyphenylene ether (A) and said ethylene copolymer (B) are melt kneaded at a temperature of 200° to 330° C.

5. The thermoplastic resin composition according to claim 1, wherein 0.05/X to 1/X of the methyl groups at the 2- and/or 6-positions of the phenylene group are modified to an aminomethyl group wherein X is a number average polymerization degree.

6. The thermoplastic resin composition according to claim 1, wherein said amino group-containing modified polyphenylene ether (A) has a number average polymerization degree of 30 to 1,000.

7. The thermoplastic resin composition according to claim 1, wherein said epoxy group-containing ethylene copolymer (B) is selected from the group consisting of a copolymer comprising ethylene units and glycidyl methacrylate units; a copolymer comprising ethylene units, glycidyl methacrylate units and methyl acrylate units; a copolymer comprising ethylene units, glycidyl methacrylate units and ethyl acrylate units; and a copolymer comprising ethylene units, glycidyl methacrylate units and vinyl acetate units.

8. The thermoplastic resin composition according to claim 1, wherein said epoxy group-containing ethylene copolymer (B) is present in an amount of from 3 to 30 parts by weight per 100 parts by weight of the amino group-containing modified polyphenylene ether (A).

9. The thermoplastic resin composition according to claim 2, wherein the amounts of said alkenyl aromatic resin (C) and said amino group-containing modified polyphenylene ether (A) are 5 to 95% by weight, and 95 to 5% by weight, respectively.

10. The thermoplastic resin composition according to claim 4, wherein said modified polyphenylene ether (A) and said ethylene copolymer (B) are melt kneaded at a temperature of 220° to 310° C.

* * * * *